United States Patent
Pack et al.

(10) Patent No.: US 10,219,210 B2
(45) Date of Patent: Feb. 26, 2019

(54) METHOD AND APPARATUS FOR SELECTING CHANNEL IN WIRELESS COMMUNICATION SYSTEM

(71) Applicants: Samsung Electronics Co., Ltd, Gyeonggi-do (KR); Korea University Research and Business Foundation, Seoul (KR)

(72) Inventors: Sangheon Pack, Seoul (KR); Haneul Ko, Gyeonggi-do (KR); Jaewook Lee, Seoul (KR)

(73) Assignees: Samsung Electronics Co., Ltd., Suwon-si (KR); Korea University Research and Business Foundation, Seoul (KR)

( * ) Notice: Subject to any disclaimer, the term of this patent is extended or adjusted under 35 U.S.C. 154(b) by 238 days.

(21) Appl. No.: 15/216,618

(22) Filed: Jul. 21, 2016

(65) Prior Publication Data
US 2017/0026970 A1    Jan. 26, 2017

(30) Foreign Application Priority Data
Jul. 21, 2015  (KR) .......................... 10-2015-0103138

(51) Int. Cl.
  *H04W 72/04* (2009.01)
  *H04W 48/18* (2009.01)
  *H04W 16/10* (2009.01)

(52) U.S. Cl.
  CPC ........... *H04W 48/18* (2013.01); *H04W 16/10* (2013.01); *H04W 72/0426* (2013.01); *H04W 72/0453* (2013.01)

(58) Field of Classification Search
  None
  See application file for complete search history.

(56) References Cited

U.S. PATENT DOCUMENTS

| 8,687,572 B2 | 4/2014 | Park |  |
| 2009/0122700 A1 * | 5/2009 | Aboba | .................. H04W 28/20 370/230 |

(Continued)

FOREIGN PATENT DOCUMENTS

| EP | 3197172 A1 * | 7/2017 |
| KR | 10-2006-0071300 | 6/2006 |
| KR | 10-2014-0076131 | 6/2014 |

OTHER PUBLICATIONS

Kyubum Lee, et al., "Channel Selection Algorithm for IEEE 802.11 Based Wireless LAN Using 2.4 GHz", 2011, http://www.dbpia.co.kr/Article/NODE02181746, 4 pages.

(Continued)

*Primary Examiner* — Michael J Moore, Jr.

(57) ABSTRACT

The present disclosure relates to a pre-$5^{th}$-Generation (5G) or 5G communication system to be provided for supporting higher data rates Beyond $4^{th}$-Generation (4G) communication system such as Long Term Evolution (LTE), a method for operating of an AP includes receiving a signal from at least one adjacent AP, generating information regarding each of channels based on the received signal, generating respective expected values by considering at least one channel to be involved in channel bonding, based on the information regarding each of the channels, and selecting a channel based on the respective expected values. An apparatus includes a controller configured to generate respective expected values for each of the channels and select a channel based on the respective expected values.

20 Claims, 10 Drawing Sheets

(56) References Cited

U.S. PATENT DOCUMENTS

| | | | | |
|---|---|---|---|---|
| 2014/0161096 A1* | 6/2014 | Tohzaka | ............... | H04L 5/0005 |
| | | | | 370/330 |
| 2015/0281288 A1* | 10/2015 | Levinson | ............... | H04L 47/41 |
| | | | | 709/219 |
| 2016/0309457 A1* | 10/2016 | Eitan | ............... | H04L 1/0079 |
| 2017/0006360 A1* | 1/2017 | Gareau | ............... | H04L 49/405 |
| 2017/0181039 A1* | 6/2017 | Adachi | ............... | H04W 48/10 |

OTHER PUBLICATIONS

Minyoung Park, et al., "IEEE 802.11ac: Dynamic Bandwidth Channel Access", 2011, IEEE Communications Society, IEEEE ICC 2011 Proceedings, 5 pages.

Lara Deek, et al., "The Impact of Channel Bonding on 802.11n Network Management", ACM CoNEXT 2011, Dec. 6-9, 2011, Tokyo, Japan, 12 pages.

IEEE P802.11ac/D5.0, "Draft Standard for Information Technology—Telecommunications and Information Exchange Between Systems—Local and Metropolitan Area Networks Specific Requirements, Part 11: Wireless LAN Medium Access Control (MAC) and Physical Layer (PHY) Specifications, Amendment 4: Enhancements for Very High Throughput for Operation in Bands Below 6 GHz", Jan. 2013, 440 pages.

IEEE Std. 802.11n, "Standard for Information Technology—Telecommunications and Information Exchange Between Systems—Local and Metropolitan Area Networks Specific Requirements, Part 11: Wireless LAN Medium Access Control (MAC) and Physical Layer (PHY) Specifications, Amendment 5: Enhancements for Higher Throughput", Oct. 29, 2009, 536 pages.

\* cited by examiner

| No$_p$ | SSID | Received Power | Channel Information |
|---|---|---|---|
| 1 | SSID1 | SSID1$_{SSID1}$ | P |
| 2 | SSID2 | SSID2$_{SSID2}$ | P |
| 3 | SSID3 | SSID3$_{SSID3}$ | P |

FIG.6

| Ch # | p | $S_{P,40}$ | $S_{P,80}$ | $S_{P,80'}$ |
|---|---|---|---|---|
| 36 | 36 | 40 | 44 | 48 |
| 40 | 40 | 36 | 44 | 48 |
| 44 | 44 | 48 | 40 | 36 |
| ... | ... | ... | ... | ... |
| 157 | 157 | 161 | 153 | 149 |
| 161 | 161 | 157 | 153 | 149 |
| 165 | 165 | - | - | - |

FIG.7

METHOD AND APPARATUS FOR SELECTING CHANNEL IN WIRELESS COMMUNICATION SYSTEM

CROSS-REFERENCE TO RELATED APPLICATION(S) AND CLAIM OF PRIORITY

The present application is related to and claims priority under 35 U.S.C. § 119 to an application filed in the Korean Intellectual Property Office on Jul. 21, 2015 and assigned Serial No. 10-2015-0103138, the contents of which are incorporated herein by reference.

TECHNICAL FIELD

The present disclosure relates to a method and an apparatus for selecting a channel in a wireless communication system.

BACKGROUND

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A Wireless Local Area Network (WLAN) is technology which enables a terminal located within a specific service providing area to wirelessly connect to the Internet based on radio frequency technology. In a WLAN system, an Access Point (AP) selects a channel and communicates using the selected channel. Due to this, the signal of a specific AP may collide with the signal of another AP using the same channel or may be disturbed by the signal of another AP using an adjacent channel. Accordingly, various methods for selecting a channel so as to minimize signal collision and interference between the APs in the WLAN system are provided. For example, a method for an AP to select a channel having no interference through channel monitoring, or a method of selecting a channel which is not adjacent to a channel used by an adjacent AP is provided as a related-art method.

Meanwhile, as the amount of data transmitted through a wireless communication system has increased, a method of bonding and using a plurality of channels to expand a transmission bandwidth has been proposed. For example, a channel bonding method which bonds adjacent channels and uses them as a single channel in a WLAN system has been proposed.

SUMMARY

To address the above-discussed deficiencies, it is a primary object to provide at least the advantages described below. Accordingly, an embodiment of the present disclosure provides a method for an Access Point (AP) to select a channel effectively in a Wireless Local Area Network (WLAN) system which supports a channel bonding method.

Another embodiment of the present disclosure provides a method and an apparatus for selecting a channel in a WLAN system which supports channel bonding.

Another embodiment of the present disclosure provides a method and an apparatus for selecting a primary channel which is a criterion of channel bonding, by considering channels involved in channel bonding in a WLAN system which supports channel bonding.

Another embodiment of the present disclosure provides a method and an apparatus which, with respect to each of channels in a WLAN system which supports channel bonding, determines an expectation value for channel competition by considering channels involved in channel bonding, and selects a channel based on the expectation value for the channel competition.

According to an embodiment of the present disclosure, a method for operating of an AP in a wireless communication system includes: receiving a signal from at least one adjacent AP; acquiring information related to each of channels based on the received signal; determining a channel competition expectation value by considering a channel to be involved in channel bonding for each of the channels, based on the information related to each of the channels; and selecting a channel based on the channel competition expectation value which is determined for each of the channels.

According to another embodiment of the present disclosure, an apparatus of an AP in a wireless communication system includes: a communication unit configured to receive a signal from at least one adjacent AP; and a controller configured to acquire information related to each of channels based on the received signal, determine a channel competition expectation value by considering a channel to be involved in channel bonding for each of the channels, based on the information related to each of the channels, and select a channel based on the channel competition expectation values which are determined for the channels.

Another embodiment of the present disclosure provides a method for operating of an Access Point (AP) in a wireless communication system. The method comprises receiving a signal from at least one adjacent AP, generating information regarding each of channels based on the received signal, generating respective expected values for each of the channels by considering at least one channel to be involved in channel bonding, based on the information regarding each of the channels, and selecting a channel based on the respective expected values.

Another embodiment of the present disclosure provides an apparatus in a wireless communication system. The apparatus comprises a communication unit configured to receive a signal from at least one adjacent AP and a controller configured to generate information regarding each of channels based on the received signal, generate respective expected values for each of the channels by considering at least one channel to be involved in channel bonding, based on the information regarding each of the channels and select a channel based on the respective expected values.

In the WLAN system supporting channel bonding according to the present disclosure, the AP selects a primary channel which is a criterion for channel bonding by considering information on channels involved in channel bonding for each channel (for example, the number of adjacent APs using each channel, an strength of a signal received through each channel, an amount of interference by the signal received through each channel, a load of each channel (or a probability that each channel is being used), etc.), so that a best channel having the lowest channel competition rate can be selected.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 6 illustrates a table including information which is acquired from a beacon signal according to an exemplary embodiment of the present disclosure;

FIG. 7 illustrates a table representing channels which are involved in channel bonding for each of channels according to an exemplary embodiment of the present disclosure;

DETAILED DESCRIPTION

Figure 1:
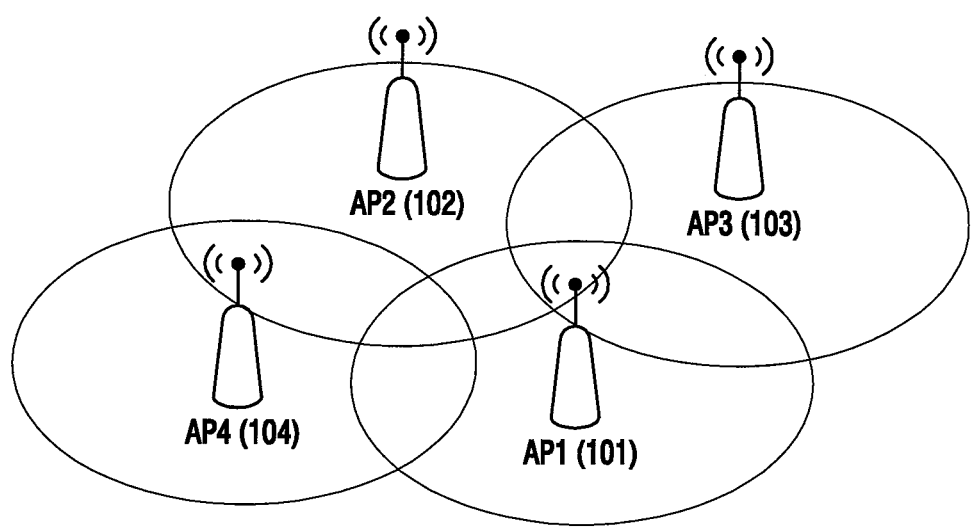
FIG. 1 illustrates a Wireless Local Area Network (WLAN) system environment.

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operational principle of the present disclosure will be described in detail with reference to the accompanying drawings. In describing the present disclosure below, a detailed description of related known configurations or functions incorporated herein will be omitted when it is determined that the detailed description thereof may unnecessarily obscure the subject matter of the present disclosure. The terms which will be described below are terms defined in consideration of the functions in the present disclosure, and may be different according to users, intentions of the users, or customs. Therefore, the definitions of the terms should be made based on the contents throughout the specification.

Hereinafter, the term indicating control information, the term indicating a timer, the term (e.g., an event) indicating the change of a status, the term indicating a network entity, the term indicating messages, the term indicating a component of an apparatus, and the like, which are used in the following descriptions, are used for ease of description. Therefore, the present disclosure may not be limited by the terminologies provided below, and other terms that have equivalent technical meanings may be used.

Hereinafter, a method in which, with respect to each of channels in a Wireless Local Area Network (WLAN) system which supports channel bonding, an Access Point (AP) determines an expectation value for channel competition by considering channels involved in channel bonding, and selects a channel based on the expectation value for the channel competition, will be explained.

The channel bonding refers to technology which bonds one or more channels to use a wide communication bandwidth in a WLAN system, and uses the bonded channels. The channels involved in the channel bonding can be divided into a primary channel and a secondary channel. For example, a channel which is a criterion of channel bonding can be referred to as a primary channel, and a channel adjacent to the primary channel can be referred to as a secondary channel. Herein, the channel adjacent to the primary channel refers to a channel which is located consecutively after the primary channel. In an IEEE 802.11 ac/n WLAN system, technology of bonding two or more channels to use a communication bandwidth wider than 20 MHz is defined. For example, in an IEEE 802.11n WLAN system, a bandwidth of 40 MHz is supported by bonding a primary channel and a secondary channel which is adjacent to the primary channel. In addition, in an IEEE 802.11ac WLAN system, bandwidths of 40 MHz and 80 MHz can essentially be supported and a bandwidth of 160 MHz can selectively be supported by bonding a primary channel and continuous secondary channels which are adjacent to the primary channel.

Figure 2:
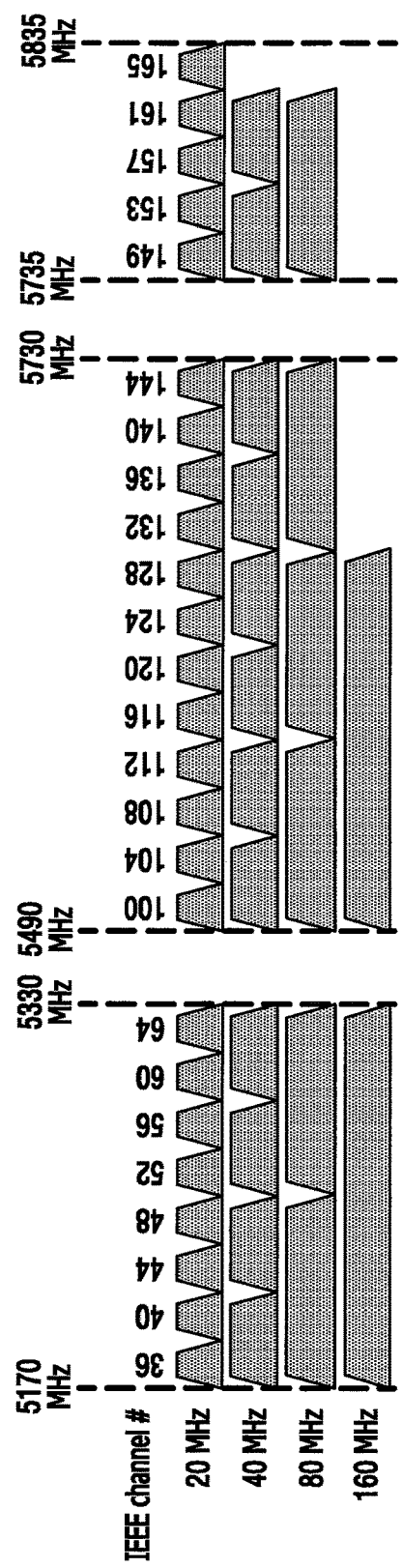
FIG. 2 illustrates an example of a communication channel which is used in a WLAN system to which an exemplary embodiment of the present disclosure is applied.

FIG. 1 illustrates a WLAN system environment. In addition, FIG. 2 illustrates an example of a communication channel which is used in a WLAN system to which an exemplary embodiment of the present disclosure is applied.

Referring to FIG. 1, a plurality of APs 101 to 104 can be installed and/or arranged on adjacent locations to have geographically overlapping cells in the WLAN system. Herein, the AP, which is an access node in the WLAN system, provides wireless access to at least one terminal. The AP can be a base station, a small base station, a host AP, or a group entity terminal which provides WLAN direct connection. Herein, the host AP is a device which provides a WLAN service to at least one wireless device through tethering. The WLAN direct can be called Wi-Fi Direct, which is a communication method for client nodes to provide a peer to peer (P2P) service through a WLAN.

According to an exemplary embodiment of the present disclosure, each of the plurality of APs 101 to 104 can communicate with at least one terminal using a single channel or two or more channels. For example, referring to a communication bandwidth of 5 GHz shown in FIG. 2, the AP 101 can communicate with a terminal using a single channel having a bandwidth of 20 MHz. In addition, the AP 101 can communicate with a terminal through a bandwidth of 40 MHz by bonding channel number 36 and channel number 40. In addition, the AP 101 can communicate with a terminal through a bandwidth of 80 MHz by bonding channel number 100, channel number 104, channel number 108, and channel number 112. In addition, the AP 101 can communicate with a terminal through a bandwidth of 160 MHz in total by bonding all of channel number 36, channel number 40, channel number 44, channel number 48, channel number 52, channel number 56, channel number 60, and channel number 64. In the following description, it is assumed that the communication bandwidth of 5 GHz as shown in FIG. 2 is used. However, the exemplary embodiments of the present disclosure can be equally applied to communication bands of other frequencies. Furthermore, although it is assumed that an AP operates in a WLAN system in the exemplary embodiments of the present disclosure, the exemplary embodiments of the present disclosure can be equally performed in a base station or an AP which supports other wireless communication systems.

According to an exemplary embodiment of the present disclosure, each of the plurality of APs 101 to 104 can select at least one channel for their own use when the AP is initially installed, when power is turned on, when the AP starts to operate as the AP, or when a channel change event occurs. In the following exemplary embodiments of the present disclosure, it is assumed that the AP 101 is newly installed for convenience of explanation. However, the following exemplary embodiments can be performed in the same way when the power of the AP is turned on, when the AP starts to operate as the AP, or when the channel change event occurs.

According to an exemplary embodiment of the present disclosure, the AP 101 can receive signals from the adjacent APs 102 to 104 when the AP 101 is initially installed, and can select a channel which has the lowest competition among the adjacent APs based on the received signals. In other words, the AP 101 can calculate an expectation value of each of the channels for channel competition by considering channels to be involved in channel bonding, based on signals received from the adjacent APs 102 to 104, and can select a channel which has the lowest expectation value for channel competition as a primary channel. For example, when the AP 101 selects a specific channel as a primary channel, the AP 101 can determine at least one secondary channels to be involved in channel bonding, acquire information on the specific channel (primary channel) and information on the determined at least one secondary channel from signals received from the adjacent APs 102 to 104, and determine a channel competition expectation value of the specific channel based on the acquired information. In this method, with respect to each of the channels, the AP 101 can determine a channel competition expectation value when a corresponding channel is selected as a primary channel, and select a channel which has the lowest channel competition expectation value as a primary channel.

For example, it is assumed that the AP 101 supports channel bonding of 40 MHz. When the AP 101 selects channel number 40 as a primary channel, the AP 101 can determine that a secondary channel to be involved in channel bonding is channel number 36, and determine a channel competition expectation value of channel number 40 using information on channel number 36 and information on channel number 40. In addition, when the AP 101 selects channel number 100 as a primary channel, the AP 101 can determine that a secondary channel to be involved in channel bonding is channel number 104, and determine a channel competition expectation value of channel number 100. In this method, the AP 101 can determine a channel competition expectation value of each of the plurality of channels by considering channels to be involved in channel bonding, and select a channel which has the lowest channel competition expectation value as a primary channel. Herein, the channel competition expectation value can be calculated based on information related to a corresponding channel, information related to channels which can be bonded with the corresponding channel, and at least one weight regarding channel bonding. The channel-related information can include information which can be acquired based on beacon signals of adjacent APs, like the number of adjacent APs using the corresponding channel, an strength of a signal received through the corresponding channel, an amount of interference by the signal received through the corresponding channel, a load of the corresponding channel (or probability that the corresponding channel is being used). The load of the corresponding channel can be a criterion for indicating how many times the corresponding channel is used by the other APs. For example, the high load of the channel can mean that the corresponding channel is frequently used by the other APs. The method for calculating the channel competition expectation value of the channel using the information on the channel as described above will be explained in detail with reference to FIG. 3.

Figure 3:
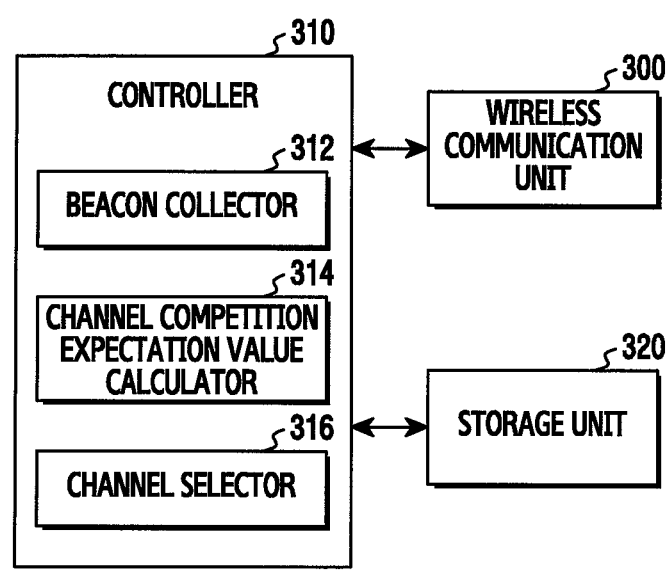
FIG. 3 illustrates a block diagram representing an Access Point (AP) according to an exemplary embodiment of the present disclosure.

FIG. 3 illustrates a block diagram representing an AP according to an exemplary embodiment of the present disclosure. The term "unit" or the term having suffix "-er" or "-or" used herein means a unit for processing at least one function or operation, and can be implemented by hardware, software, or a combination of hardware and software.

Referring to FIG. 3, the AP can include a wireless communication unit 330, a controller 310, and a storage unit 320.

The wireless communication unit 300 can transmit and receive signals for providing wireless access to at least one terminal. For example, the wireless communication unit 300 performs a function of transmitting and receiving signals to and from at least one adjacent AP and at least one terminal. Although not shown, the wireless communication unit 300 can include a Radio Frequency (RF) processor (not shown) and a baseband processor (not shown). The RF processor performs a function of transmitting and receiving signals through a radio channel, such as signal band conversion, amplification, etc. The RF processor can up-convert a baseband signal provided by the baseband processor into an RF band signal, and then transmit the signal through an antenna, and can down-convert an RF band signal received through the antenna into a baseband signal. For example, the RF processor can include a transmission filter, a reception filter, an amplifier, a mixer, an oscillator, a digital-analogue converter, an analogue-digital converter, etc. The baseband processor performs a function of converting between a baseband signal and a bit string according to a physical layer standard of the WLAN system. For example, the baseband processor can generate complex symbols by encoding and modulating a transmission bit string when transmitting data, and can restore a reception bit string by demodulating and decoding a baseband signal provided by the RF processor when receiving data. The wireless communication unit 300 can transmit and receive signals in the above-described method. Accordingly, the wireless communication unit 300 can be referred to as a transmission unit, a reception unit, a transmission and reception unit, or a communication unit.

Figure 5:
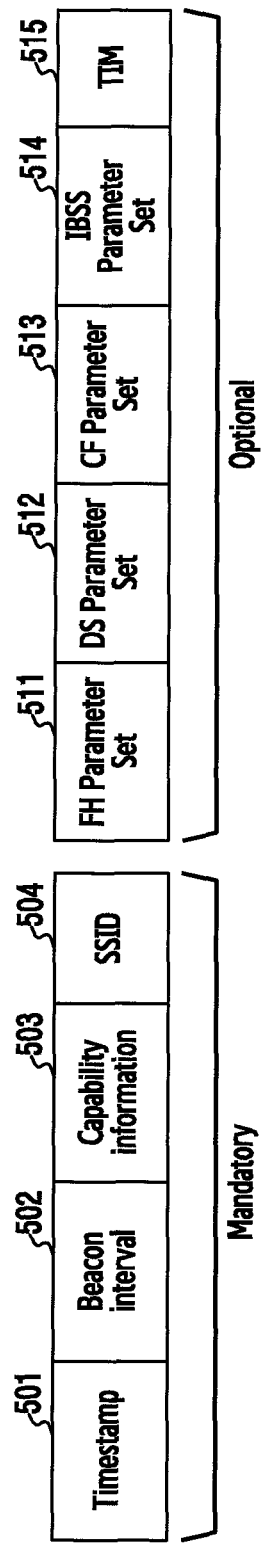
FIG. 5 illustrates a structure of a beacon frame according to an exemplary embodiment of the present disclosure.

According to an exemplary embodiment of the present disclosure, the wireless communication unit 300 can monitor each of channels and receive a beacon signal under the control of the controller 310. According to an exemplary embodiment of the present disclosure, the frame of the beacon signal can essentially include a timestamp 501, a beacon interval 502, capability information 503, and a Service Set IDentifier (SSID) 504, as shown in FIG. 5. Herein, the timestamp 501 can indicate a time at which the beacon signal is transmitted, the beacon interval 502 can indicate a transmission interval of the beacon signal, and the capability information 503 can indicate a specific function which is required for a terminal which wishes to access the corresponding AP. In addition, the frame of the beacon signal can selectively include a frequency hopping (FH) parameter set 511, a direct sequence (DS) parameter set 512, a contention free (CF) parameter set 513, an independent basic service set (IBSS) parameter set 514, or a traffic indication map (TIM) 515. The wireless communication unit 300 can provide the received beacon frame of the adjacent AP to the controller 310. In addition, according to an exemplary embodiment of the present disclosure, the wireless communication unit 300 can transmit and receive signals using a channel which is selected by the controller 310. For example, the wireless communication unit 300 can communicate with a terminal using a single channel or can communicate with a terminal using two or more bonded channels.

The controller 310 controls an overall operation of the AP according to an exemplary embodiment of the present disclosure. For example, the controller 310 can transmit and receive signals through the wireless communication unit 300. In addition, the controller 310 can record data on the storage unit 320 and read out data recorded on the storage unit 320. To achieve this, the controller 310 can include at least one processor. The controller 310 can perform a function of communicating with at least one terminal using a single channel or two or more bonded channels.

According to an exemplary embodiment of the present disclosure, the controller 310 can select at least one channel. For example, the controller 310 can select at least one channel for its own use when the AP is initially installed, when power is turned on, when the AP starts to operate as the AP, or when a channel change event occurs. The controller 310 can extract channel-related information regarding each channel from the beacon signal received from the wireless communication unit 300, and calculate a channel competition expectation value of each channel by considering channel bonding, based on the extracted channel-related information of each channel. In other words, the controller 310 can calculate the channel competition expectation value of each channel by using channel-related information of channels which are predicted to be involved in channel bonding according to a bandwidth to be used by the AP, from among the channel-related information of the channels, and select a channel based on the calculated channel competition expectation value.

The controller 310 can include a beacon collector 312, a channel competition expectation value calculator 314, and a channel selector 316 to select at least one channel.

The beacon collector 312 can acquire the channel-related information regarding each channel based on the beacon signal of at least one adjacent AP, which is received through the wireless communication unit 300. For example, the beacon collector 312 can acquire an SSID which is beacon identification information from the beacon signal having the frame structure as shown in FIG. 5. In addition, the beacon collector 312 can acquire the reception strength of the beacon signal and channel information. In addition, the beacon collector 312 can acquire information such as the number of adjacent APs using each channel, the strength of the beacon signal received through each channel, an amount of interference caused by the beacon signal received through each channel, and the load of each channel (a probability that a corresponding channel is being used), based on the beacon signal of the at least one adjacent AP. The beacon collector 312 can store the information acquired based on the beacon signal in the storage unit 320. For example, the beacon collector 312 can provide the storage unit 320 with identification information (for example, an SSID) of the AP which has transmitted the beacon signal, received power of the beacon signal, channel information corresponding to the beacon signal, etc., as shown in FIG. 6. In addition, the beacon collector 312 can provide the storage unit 320 with the channel-related information which is generated based on the information acquired from the beacon signal. The beacon collector 312 can acquire and store the channel-related information on each channel when the AP is initially installed, when the power is turned on, when the AP starts to operate as the AP, when the channel change event occurs, or at predetermined intervals.

The channel competition expectation value calculator 314 calculates a channel competition expectation value of each channel by considering channels to be involved in channel bonding, that is, a primary channel and secondary channels, based on the channel-related information of each channel. In other words, the channel competition expectation value calculator 314 can calculate the channel competition expectation value by considering the primary channel and the secondary channels involved in channel bonding, based on the channel-related information of each channel, as shown in Equation 1 presented below:

$$I_P = w_{20} \times A_{20,p} + w_{40} \times A_{40,p} + w_{80} \times A_{80,p} \text{ where, } w_{20} + w_{40} + w_{80} = 1 \quad \text{(Equation 1)}$$

Herein, IP means a channel competition expectation value of a channel p. In addition, AB,p means a channel-related factor of at least one channel which is involved in channel bonding for a bandwidth of B MHz when the channel p is a primary channel. Herein, B can be 20, 40, and 80. For example, A20,p means a channel-related factor of a primary channel which is involved in channel bonding for a bandwidth of 20 MHz when the channel p is a primary channel.

In addition, A40,p means a channel-related factor of a primary channel and a secondary channel which are involved in channel bonding for a bandwidth of 40 MHz when the channel p is a primary channel. In addition, A80,p means a channel-related factor of a primary channel and a plurality of secondary channels which are involved in channel bonding for a bandwidth of 80 MHz when the channel p is a primary channel.

In addition, $w_{20}$, $w_{40}$, and $w_{80}$ mean weights for the bandwidths of 20 MHz, 40 MHz, and 80 MHz, respectively. $w_{20}$, $w_{40}$, and $w_{80}$ can be determined so that the sum of $w_{20}$, $w_{40}$, and $w_{80}$ equals 1. The weights $w_{20}$, $w_{40}$, and $w_{80}$ can be set by considering a throughput and a frequency of bonding in the WLAN system. For example, the channel bonding method of 80 MHz can have the highest throughput since it uses a wider bandwidth than 20 MHz and 40 MHz, but can have the lowest frequency of bonding (or frequency of use) since channel bonding is possible when a primary channel and three secondary channels are not used. In addition, the channel bonding method of 20 MHz can have the lowest throughput since it uses a narrower bandwidth than 40 MHz and 80 MHz, but can have the highest frequency of bonding (or frequency of use) since channel bonding is possible when a primary channel is not used. Accordingly, the throughput and the frequency of bonding can be considered to determine $w_{20}$, $w_{40}$, and $w_{80}$ in an exemplary embodiment of the present disclosure. According to an exemplary embodiment, when the AP intends to assure a minimum throughput, the channel competition expectation value calculator 314 gives higher priority to the frequency of bonding than the throughput. Therefore, the channel competition expectation value calculator 314 can set a greatest weight for 20 MHz which has the highest frequency of bonding, and can set the same weight for the other bandwidths. For example, the channel competition expectation value calculator 314 can set the weights to satisfy $w_{20} > w_{40} = w_{80}$. The channel competition expectation value calculator 314 can assure the throughput of the bandwidth of 20 MHz by setting the weight $w_{20}$, that is, the weight for a primary channel to be the greatest value. The method of setting the weight $w_{20}$ to be the greatest value as described above is suitable for a case in which there are many adjacent APs.

In another example, when the AP intends to assure a maximum throughput, the channel competition expectation value calculator 314 can give higher priority to the throughput than the frequency of bonding, and can set the weight $w_{80}$ for 80 MHz, which is the widest bandwidth, to be the greatest value, and set the weight for 20 MHz, which is the narrowest bandwidth, to be the smallest value. For example, the channel competition expectation value calculator 314 can set the weights to satisfy $w_{20} < w_{40} < w_{80}$. The channel competition expectation value calculator 314 sets the weight $w_{80}$ to be the greatest value, so that a channel having the lowest channel competition expectation value in the entire 80 MHz can be selected. The method of setting the weight $w_{80}$ to be the greatest value is suitable for a case in which the number of adjacent APs is small and thus it is possible to bond channels of wide bandwidths.

In another example, when the AP intends to assure an average throughput, the channel competition expectation value calculator 314 can consider only the frequency of bonding, and can set the weight $w_{20}$ for 20 MHz, which is the narrowest bandwidth, to be the greatest value and set the weight $w_{80}$ for 80 MHz, which is the widest bandwidth, to be the smallest value. For example, the channel competition expectation value calculator 314 can set the weights to satisfy $w_{20} > w_{40} > w_{80}$. The channel competition expectation value calculator 314 can assure the average throughput by setting the weight $w_{20}$ to be the greatest value and setting the weight $w_{80}$ to be the smallest value. The above-described weights $w_{20}$, $w_{40}$, and $w_{80}$ can be directly set and changed under the control of a designer, an operator, and/or a user.

Additionally, $A_{B,p}$ in Equation 1 according to an exemplary embodiment of the present disclosure can be calculated using Equation 2 presented below:

$$A_{B,p} = \begin{cases} A_p, & \text{if } B = 20 \\ A_p + A_{S_{p,40}}, & \text{if } B = 40 \\ A_p + A_{S_{p,40}} + A_{S_{p,80}} + A_{S_{p,80'}}, & \text{if } B = 80 \end{cases} \quad \text{(Equation 2)}$$

Herein, $A_{B,p}$ means a channel-related factor of at least one channel which is involved in channel bonding for a bandwidth of B MHz when the channel p is a primary channel. In addition, $S_{p,40}$ means a secondary channel which is involved in channel bonding for the bandwidth of 40 MHz when the channel p is a primary channel. In addition, $S_{p,80}$ and $S_{p,80'}$ mean secondary channels which are additionally involved in channel bonding for the bandwidth of 80 MHz when the channel p is a primary channel.

For example, when only a single channel of 20 MHz is used, only the channel p which is the primary channel is used and thus $A_{B,p}$ can be $A_p$. On the other hand, when channel bonding of 40 MHz is used, the channel p which is the primary channel and a single secondary channel which is adjacent to the channel p are used and thus $A_{B,p}$ can be determined by the sum of $A_p$ and $A_{S_{p,40}}$. In addition, when channel bonding of 80 MHz is used, the channel p which is the primary channel and three secondary channels which are adjacent to the channel p and thus $A_{B,p}$ can be determined by the sum of $A_p$, $A_{S_{p,40}}$, $A_{S_{p,80}}$, and $A_{S_{p,80'}}$.

According to an exemplary embodiment of the present disclosure, the channel competition expectation value calculator 314 can use any one piece of the channel-related information which can be acquired from the beacon signal of an adjacent AP, for example, the number of adjacent APs using each channel, the strength of a signal received through each channel, an amount of interference caused by the signal received through each channel, and a load of each channel (a probability that a channel is being used), as the channel-related factor A shown in Equations 1 and 2.

For example, the channel competition expectation value calculator 314 can determine the channel competition expectation value as shown in Equation 1 using the number of adjacent APs using each channel. More specifically, the channel competition expectation value calculator 314 can acquire the number of adjacent APs using a corresponding channel with respect to each channel from the beacon collector 312. For example, the channel competition expectation value calculator 314 can acquire information indicating that the number of adjacent APs using channel number 36 is a, the number of adjacent APs using channel number 40 is b, the number of adjacent APs using channel number 44 is c, the number of adjacent APs using channel number 48 is d, ..., and the number of adjacent APs using channel number 165 is n. Herein, the channel competition expectation value calculator 314 can determine that $A_{36}=a$, $A_{40}=b$, $A_{44}=c$, $A_{48}=d$, ..., $A_{165}=n$. In this case, in order to calculate a channel competition expectation value $I_{36}$ for channel number 36, the channel competition expectation value calculator 314 can determine secondary channels for channel number 36 based on FIG. 7 indicating channels involved in channel bonding for each channel. For example, when channel number 36 is a primary channel, the channel competition expectation value calculator 314 can determine that a secondary channel involved in channel bonding of 40 MHz is channel number 40 and a secondary channel involved in channel bonding of 80 MHz is channel number 44 and channel number 48. Thereafter, the channel competition expectation value calculator 314 can determine the channel competition expectation value for channel number 36 by using the number of adjacent APs using channel number 36, the number of adjacent APs using channel number 40, the number of adjacent APs using channel number 44, and the number of adjacent APs using channel number 48. For example, according to Equation 1, $I_{36}$ equals $w_{20} \times A_{20,36} + w_{40} \times A_{40,36} + w_{80} \times A_{80,36}$ which is rearranged as $w_{20} \times (A_{20}) + w_{40} \times (A_{36} + A_{40}) + w_{80} \times (A_{36} + A_{40} + A_{44} + A_{48})$ according to Equation 2. Accordingly, when $A_{36}=a$, $A_{40}=b$, $A_{44}=c$, $A_{48}=d$, ..., $A_{165}=n$, the channel competition expectation value calculator 314 can calculate the channel competition expectation value $I_{36}$ for channel number 36 based on equation $w_{20} \times (a) + w_{40} \times (a+b) + w_{80} \times (a+b+c+d)$. The channel competition expectation value calculator 314 can calculate channel competition expectation values for all of the channels in the above-described method.

In another example, the channel competition expectation value calculator 314 can determine the channel competition expectation value as shown in Equation 1 using the strength of the signal received through each channel. The strength of the signal received through each channel can mean a distance to an adjacent AP using a corresponding channel. When signals are received from the plurality of adjacent APs through a specific channel, the channel competition expectation value calculator 314 can measure the intensities of the signals received from the plurality of adjacent APs, and determine and use the greatest reception strength as the signal reception strength of the corresponding channel. The channel competition expectation value calculator 314 can determine the channel competition expectation value as shown in Equation 1 using the signal reception strength of each channel which is determined in the above-described way.

In another example, the channel competition expectation value calculator 314 can determine the channel competition expectation value as shown in Equation 1 using the load of each channel (a probability that a channel is being used). For example, the AP in the WLAN system can monitor the state of each channel during a predetermined time. Accordingly, the controller 310 of the AP can detect whether a corresponding channel is being used by an adjacent AP (a busy state) or is not being used by the adjacent AP (an idle state) by monitoring the channel. Accordingly, the channel competition expectation value calculator 314 can measure a probability that each channel is being used by the adjacent AP, and determine the probability that each channel is being used by the adjacent AP as a channel load. The channel competition expectation value calculator 314 can determine the channel competition expectation value using the channel load of each channel.

The channel selector 316 can receive the channel competition expectation value of each channel from the channel competition expectation value calculator 314, and selects a channel having the lowest channel competition expectation value as a primary channel. For example, the channel selector 316 can select the primary channel using Equation 3 presented below:

$$P^* = \underset{p \in P}{\mathrm{argmin}} I_P \quad \text{(Equation 3)}$$

Herein, P* means a primary channel which is selected by the channel selector 316. In addition, P means a set of all channels which can be supported in the AP, and $I_P$ means a channel competition expectation value for a channel p.

The channel select 316 can select the channel having the lowest channel competition expectation value as the primary channel, and then can select a secondary channel to be involved in channel bonding with reference to the selected primary channel. In addition, the channel selector 316 can determine a channel bonding bandwidth and select a secondary channel which is adjacent to the primary channel according to the determined channel bonding bandwidth. For example, when the determined channel bonding bandwidth is 40 MHz, the channel selector 316 can select a single channel which is adjacent to the primary channel as the secondary channel. In another example, when the determined channel bonding bandwidth is 80 MHz, the channel selector 316 can select three channels which are adjacent to the primary channel as secondary channels. On the other hand, when the determined channel bonding bandwidth is 20 MHz, the channel selector 316 may not select the secondary channel and use only the primary channel. According to an exemplary embodiment, the channel elector 316 can select the secondary channel with reference to a table which shows channels involved in channel bonding for each channel and is stored in the storage unit 320.

The storage unit 320 stores data such as a basic program for operating the AP, an application program, setting information, etc. In particular, the storage unit 320 can store the information which is acquired from the beacon signal of the adjacent AP under the control of the controller 310. For example, the storage unit 320 can store identification information (for example, an SSID) of the AP which has transmitted the beacon signal, channel information corresponding to the beacon signal, received power of the beacon signal, etc., as shown in FIG. 6. In addition, the storage unit 320 can store the channel-related information which is generated based on the information acquired from the beacon signal under the control of the controller 310. For example, the storage 320 can store the information which can be acquired regarding each channel based on the beacon signal of the adjacent AP, such as the number of adjacent APs using a corresponding channel, an strength of a signal received through the corresponding channel, an amount of interference by the signal received through the corresponding channel, a load of the corresponding channel (or a probability that the corresponding channel is being used). The load of the corresponding channel can be a criterion for indicating how many times the corresponding channel is used by the other APs. For example, the high load of the channel can mean that the corresponding channel is frequently used by the other APs. In addition, the high strength of the received signal can mean that the adjacent AP using the corresponding channel is relatively close to the AP, and the low strength of the received signal can mean that the adjacent AP using the corresponding channel is relatively far from the AP.

In addition, the storage unit 320 can store a table indicating channels which are involved in channel bonding for each channel under the control of the controller 310. For example, as shown in FIG. 7, the storage unit 320 can store channel number $S_{p,40}$ of the secondary channel which is involved in channel bonding for the bandwidth of 40 MHz, and channel numbers $S_{p,40}$, $S_{p,80}$, and $S_{p,80'}$ of the secondary channels which are involved in channel bonding for the bandwidth of 80 MHz when the channel p is selected as the primary channel. For example, the table shown in FIG. 7 can show that, when the controller 310 selects channel number 40 as the primary channel, channel number 36 will be involved in channel bonding for the bandwidth of 40 MHz.

In addition, the table shown in FIG. 7 can show that, when the controller 310 selects channel number 40 as the primary channel, channel numbers 36, 44, and 48 will be involved in channel bonding for the bandwidth of 80 MHz. The channels involved in channel bonding for each channel as shown in FIG. 7 are merely an example, and the channels involved in channel bonding can be configured differently according to a channel bonding combination. For example, when there are a plurality of combinations of channels which are selected as a secondary channel for a specific primary channel, the storage unit 320 can store a table indicating the plurality of channel combinations.

Figure 4:
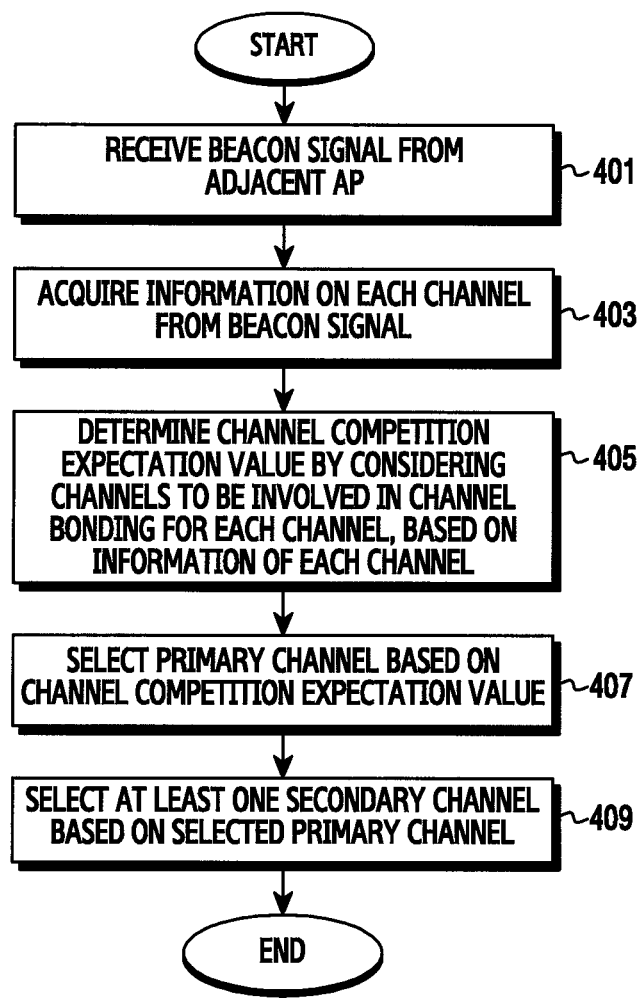
FIG. 4 illustrates an operation procedure of the AP according to an exemplary embodiment of the present disclosure.

FIG. 4 illustrates a view showing an operation procedure of an AP according to an exemplary embodiment of the present disclosure.

Referring to FIG. 4, the AP receives a beacon signal from an adjacent AP in step 401. For example, the AP can monitor all channels which can be supported and receive a beacon signal from at least one adjacent AP. The AP can receive the beacon signal from the adjacent AP when the AP is initially installed, when power is turned on, when the AP starts to operate as the AP, when a channel change event occurs, or when a predetermined period begins.

In step 403, the AP acquires information on each channel from the received beacon signal. For example, as shown in FIG. 5, the frame of the beacon signal can essentially include a timestamp, a beacon interval, capability information, and an SSID, and can selectively include a frequency hopping (FH) parameter set, a direct sequence (DS) parameter set, a contention free (CF) parameter set, an independent basic service set (IBSS) parameter set, or a traffic indication map (TIM). The AP can acquire the information on each channel from the beacon signal of the adjacent AP, which is received through each channel. Herein, the information on each channel can include identification information (for example, an SSID) on the AP which has transmitted the corresponding beacon signal, channel information corresponding to the corresponding beacon signal, received power of the corresponding beacon signal, etc., as shown in FIG. 6. Additionally, the information on each channel can include the number of adjacent APs using each channel, an strength of a signal received through each channel, an amount of interference caused by the signal received through each channel, a load of each channel (a probability that the corresponding channel is being used), etc. For example, the AP can determine the number of adjacent APs using each channel based on the beacon signal received from the adjacent AP through each channel. In addition, the AP can monitor each channel during a predetermined time and detect whether each channel is being used by the adjacent AP or is not being used by the adjacent AP, and can measure a probability that each channel is being used by the adjacent AP based on the result of the detecting. The AP can determine the probability that the channel is being used by the adjacent AP as the load of the corresponding channel. In addition, the AP can measure the reception strength of the beacon signal received from the adjacent AP through each channel. In this case, when the plurality of adjacent APs use the same single channel, the AP can measure an average reception strength of beacon signals received from the adjacent APs using the same channel, and determine the average strength as the signal reception strength of the corresponding channel. In addition, when the plurality of adjacent APs use the same single channel, the AP can determine the highest reception strength from among the reception intensities of the beacon signals received from the adjacent APs using the same channel, as the signal reception strength of the corresponding channel. According to an exemplary embodiment, the AP can acquire channel-related information using other signals received from the adjacent AP instead of the beacon signal of the adjacent AP.

In step 405, the AP determines a channel competition expectation value by considering other channels to be involved in channel bonding for each channel based on the information on each channel. For example, the AP calculates the channel competition expectation value by considering channels to be involved in channel bonding for each channel, that is, a primary channel and secondary channels, based on a channel-related factor value on each channel. In other words, the AP can calculate the channel competition expectation value by considering the primary channel and the secondary channel to be involved in channel bonding, based on the channel-related factor on each channel, as shown in Equation 1 described above. Herein, the channel-related factor value can be one piece of the information on each channel which is acquired in step 403, for example, the number of adjacent APs using each channel, the strength of the signal received through each channel, the amount of interference caused by the signal received through each channel, and the load of each channel (the probability that the channel is being used). When the channel-related factor is the number of adjacent AP using a corresponding channel, the AP can calculate the channel competition expectation value by considering all of the channels to be involved in channel bonding, based on the number of adjacent APs using each channel. In this case, the AP can determine weights $w_{20}$, $w_{40}$, and $w_{80}$ for each channel bonding by considering at least one of a throughput and a frequency of bonding in the WLAN system.

Thereafter, in step 407, the AP selects a primary channel based on the channel competition expectation value. For example, the AP compares the channel competition expectation values of the channels, and selects a channel which has the lowest channel competition expectation value as the primary channel.

Thereafter, in step 409, the AP selects at least one secondary channel based on the selected primary channel. For example, the AP can select at least one channel which is located consecutively after the selected primary channel as the secondary channel. The AP can select the secondary channel to be involved in channel bonding by considering a bandwidth size for channel bonding. For example, when channel bonding for the bandwidth of 40 MHz is supported, the AP can select a single channel which is located consecutively after the primary channel as the secondary channel. In addition, when channel bonding for the bandwidth of 80 MHz is supported, the AP can select three channels which are located consecutively after the primary channel as the secondary channels. Meanwhile, according to an exemplary embodiment, the AP may not select the secondary channel to support the bandwidth of 20 MHz. In addition, according to an exemplary embodiment, the AP can automatically determine the secondary channel with respect to the primary channel based on a pre-stored table as shown in FIG. 7.

In the above description, it was assumed that the secondary channels to be involved in channel bonding for each channel were fixed. For example, it was assumed that, when channel number 44 is the primary channel, the secondary channels to be involved in channel bonding of 80 MHz are channel numbers 48, 40, and 36 as shown in FIG. 7. However, according to an exemplary embodiment, a plurality of combinations of channels can be selected as secondary channels for a specific primary channel. For example, the secondary channels for channel number 44 can be channel numbers 36, 40, and 48, channel numbers 40, 48, and 52, or channel numbers 48, 52 and 56. Accordingly, various combinations of secondary channels can be stored according to various exemplary embodiments of the present disclosure. In this case, $A_{B,p}$ in Equations 1 and 2 can be determined based on one of the combinations of various channels involved in primary channel bonding that has the smallest channel-related factor value. For example, when there are a plurality of secondary channel combinations which can be selected with respect to the primary channel, $A_{B,p}$ can be calculated as shown in Equation 4 presented below:

$$A_{B,p} = \min_{s \in S_{B,p}} A_{B,p,s} \quad \text{(Equation 4)}$$

Herein, $A_{B,p}$ means channel-related information regarding channels which are involved in channel bonding for a bandwidth B when the channel p is the primary channel. $S_{B,p}$ means a set of combinations of channels which are involved in channel bonding for the bandwidth B when the channel p is the primary channel, and s means an element of $S_{B,p}$. For example, s means one of the combinations of the channels which are involved in channel bonding for the bandwidth B when the channel p is the primary channel. For example, when channel number 44 is the primary channel, there are three combinations of the channels which are involved in channel bonding for the bandwidth of 80 MHz. For example, when channel number 44 is the primary channel, combinations of channels which can be selected for the bandwidth of 80 MHz can be channel numbers "36, 40, 44, and 48," channel numbers "40, 44, 48, and 52," or channel numbers "44, 48, 52, and 56." That is, s can mean one of the three channel combinations.

Accordingly, when the channel-related factor is the number of adjacent APs using a corresponding channel, $A_{B,p}$ can be determined based on the smallest number of adjacent APs from among the numbers of adjacent APs regarding each of the channel combinations. In addition, when the channel-related factor is a load of a corresponding channel, $A_{B,p}$ can be determined based on the smallest number of adjacent APs from among the numbers of adjacent APs regarding each of the channel combinations.

Accordingly, when the channel-related factor is the number of adjacent APs using a corresponding channel, $A_{B,p}$ can be determined based on the smallest number of adjacent APs from among the numbers of adjacent APs regarding each of the channel combinations. In addition, when the channel-related factor is a load of a corresponding channel, $A_{B,p}$ can be determined based on the smallest number of adjacent APs from among the numbers of adjacent APs regarding each of the channel combinations.

When there are a plurality of combinations of channels which can be selected for channel bonding as described above, the AP can determine the secondary channel by selecting a combination which has the smallest channel-related factor from among the combinations of the selectable channels, after selecting the primary channel. For example, when channel number 44 is selected as the primary channel as described above, a channel combination which has the smallest number of adjacent APs using the corresponding channel can be selected from the three selectable channel combinations, channel numbers "36, 40, 44, and 48," channel numbers "40, 44, 48, and 52," or channel numbers "44, 48, 52, and 56."

Figure 8:
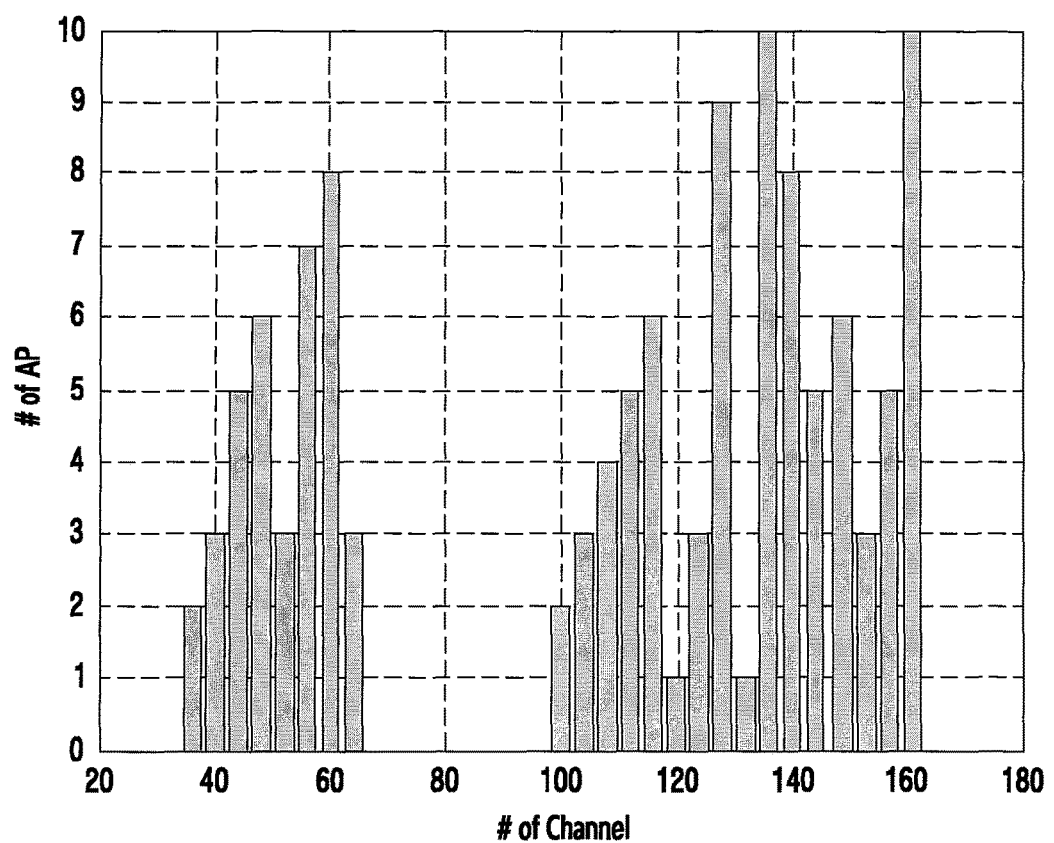
FIG. 8 illustrates a graph representing the number of adjacent APs for each of the channels according to an exemplary embodiment of the present disclosure.
Figure 9:
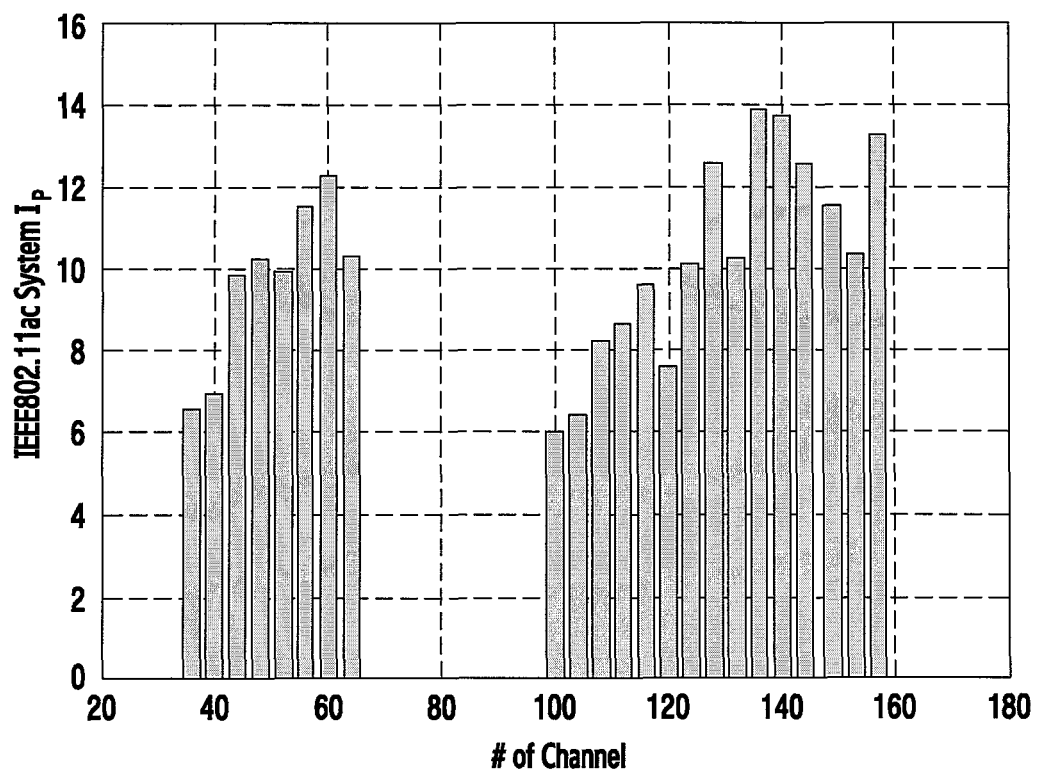
FIGS. 9 and 10 illustrate graphs representing a channel competition expectation value which is determined by considering channels involved in channel bonding for each of the channels according to an exemplary embodiment of the present disclosure.
Figure 10:
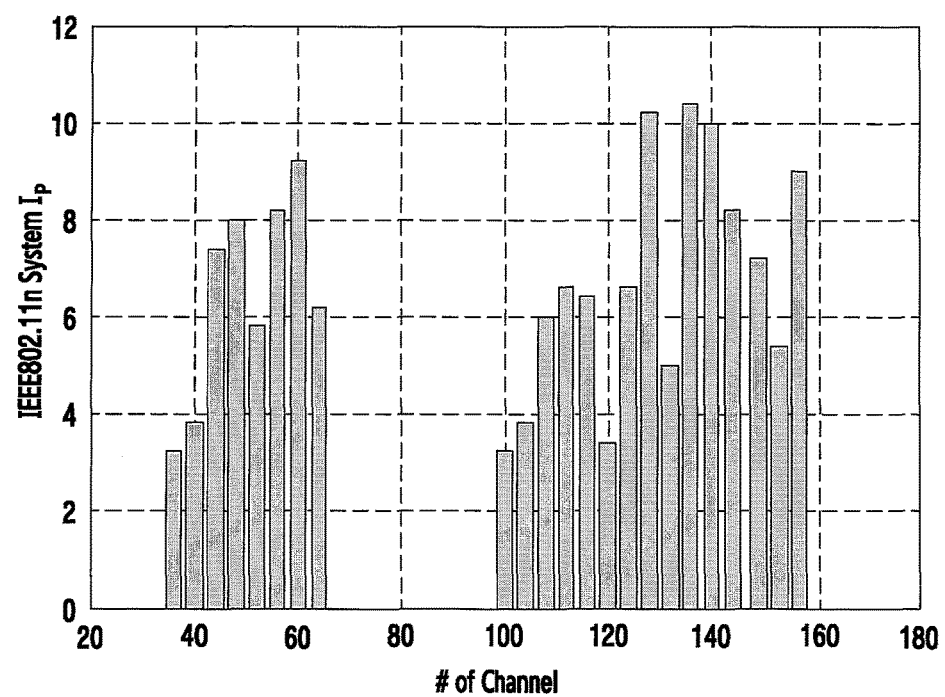

FIG. 8 illustrates a graph representing the number of adjacent APs for each channel according to an exemplary embodiment of the present disclosure. Herein, the horizontal axis indicates the channel number and the vertical axis indicates the number of adjacent APs using a corresponding channel. In addition, FIGS. 9 and 10 illustrate graphs representing a channel competition expectation value which is determined by considering channels involved in channel bonding for each channel according to an exemplary embodiment of the present disclosure. Herein, the horizontal axis indicates the channel number and the vertical axis indicates the channel competition expectation value of each channel which is calculated according to an exemplary embodiment of the present disclosure. In addition, FIG. 9 illustrates the channel competition expectation value for each channel when the weights $w_{20}$, $w_{40}$, and $w_{80}$ corresponding to channel bonding are set to 0.45, 0.35, and 0.2, respectively, on the assumption of an IEEE 802.11 ac system which supports channel bonding of 40 MHz and 80 MHz. In addition, FIG. 10 illustrates the channel competition expectation value for each channel when the weights $w_{20}$, $w_{40}$, and $w_{80}$ corresponding to channel bonding are set to 0.6, 0.4, and 0, respectively, on the assumption of an IEEE 802.11n system which supports channel bonding of 40 MHz.

Referring to FIG. 8, channel number 120 and channel number 132 are used by the smallest number of adjacent APs, that is, by one adjacent AP. Therefore, when a channel is selected in the related-art method, the AP can select channel number 120 or 130 as a primary channel. However, in this case, since many adjacent APs use adjacent channels involved in channel bonding, communication efficiency can deteriorate when the AP uses the channel bonding method. For example, when the AP selects channel number 132 as the primary channel, the AP can use channel numbers 132 and 128 or can use channel numbers 132 and 136 to support the channel bonding method of 40 MHz. However, in this case, the number of adjacent APs using channel number 132 is 9 and the number of adjacent APs using channel number 136 is 10. That is, since so many adjacent APs use these channels in comparison to the other channels, it can be very inefficient for the AP to use channel number 132 or 136.

On the other hand, referring to FIG. 9, channel number 100 has the smallest channel competition expectation value. Accordingly, the AP according to an exemplary embodiment of the present disclosure can select channel number 100 as a primary channel and select at least one channel which is adjacent to channel number 100 as a secondary channel for channel bonding. For example, the AP can select channel number 100 as the primary channel and select channel numbers 104, 108, and 112 as the secondary channels for channel bonding of 80 MHz. In this case, the numbers of adjacent APs using channel numbers 100, 104, 108, and 112 are 2, 3, 4, and 5, respectively, as shown in FIG. 8, and are smaller than the numbers of adjacent APs using the other channels.

In addition, referring to FIG. 10, channel numbers 36 and 100 have the smallest channel competition expectation values. Accordingly, the AP according to an exemplary embodiment of the present disclosure can select channel number 36 as the primary channel and select one channel which is adjacent to channel number 36 as the secondary channel for channel bonding, or can select channel number 100 as the primary channel and select one channel which is adjacent to channel number 100 as the secondary channel for channel bonding. For example, the AP can select channel number 36 as the primary channel and select channel number 40 as the secondary channel for channel bonding of 40 MHz. In this case, the numbers of adjacent APs using channel numbers 36 and 40 are 2 and 3, respectively, as shown in FIG. 8, and are smaller than the numbers of adjacent APs using the other channels.

Accordingly, the AP according to an exemplary embodiment of the present disclosure selects a channel by considering all of the channels involved in channel bonding, so that a best channel having the lowest channel competition rate can be selected.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating of an access point (AP) in a wireless communication system, the method comprising:
   receiving a signal from at least one adjacent AP;
   generating information regarding each of channels based on the received signal;
   generating respective expected values for each of the channels by considering at least one channel to be involved in channel bonding, based on the information regarding each of the channels; and
   selecting a channel based on the respective expected values.

2. The method of claim 1, wherein the information regarding each of the channels comprises at least one of a number of adjacent APs using each channel, a signal reception strength of each channel, an amount of interference of each channel, and a load of each channel.

3. The method of claim 1, wherein generation of the respective expected values comprises:
   with respect to each of the channels, determining at least one adjacent channel which is predicted to be involved in channel bonding according to a channel bonding bandwidth; and
   with respect to each of the channels, determining the respective expected values based on information regarding a corresponding channel and information regarding at least one adjacent channel which is determined for the corresponding channel.

4. The method of claim 3, wherein the determining, with respect to each of the channels, the respective expected values based on the information regarding the corresponding channel and the information regarding the at least one adjacent channel which is determined for the corresponding channel comprises:
   determining a weight for each of channel bonding bandwidths; and
   with respect to each of the channels, determining the respective expected values based on the weight for each of the channel bonding bandwidths, the information regarding the corresponding channel, and the information regarding the at least one adjacent channel that is determined for the corresponding channel.

5. The method of claim 4, wherein the weight for each of the channel bonding bandwidths is determined based on at least one of a throughput and a frequency of channel bonding.

6. The method of claim 5, wherein the weights for the channel bonding bandwidths are set such that a weight for a narrowest channel bonding bandwidth from among the channel bonding bandwidths has a greater value than the weights for the other channel bonding bandwidths, and the weights of the other channel bonding bandwidths have a same value.

7. The method of claim 5, wherein the weights for the channel bonding bandwidths are set such that a weight for a widest channel bonding bandwidth from among the channel bonding bandwidths has a greater value than the weights of the other channel bonding bandwidths, and the weight for a narrowest channel bonding bandwidth has a smaller value than the weights for the other channel bonding bandwidths.

8. The method of claim 5, wherein the weights for the channel bonding bandwidths are set such that a weight for a channel bonding bandwidth having a highest frequency of channel bonding from among the channel bonding bandwidths has a greater value than the weights for the other channel bonding bandwidths, and a weight for a channel bonding bandwidth having a lowest frequency of channel bonding has a smaller value than the weights for the other channel bonding bandwidths.

9. The method of claim 1, wherein the selecting the channel based on the respective expected values comprises selecting a channel which has a lowest expected value as a primary channel that is a criterion for channel bonding.

10. The method of claim 9, further comprising: selecting at least one secondary channel which is located consecutively after the primary channel, and wherein a number of the selected secondary channels is determined based on a size of a channel bonding bandwidth.

11. An apparatus in a wireless communication system, the apparatus comprising:
   a communication circuit configured to receive a signal from at least one adjacent access point (AP); and
   a controller configured to:
      generate information regarding each of channels based on the received signal;
      generate respective expected values for each of the channels by considering at least one channel to be involved in channel bonding, based on the information regarding each of the channels; and
      select a channel based on the respective expected values.

12. The apparatus of claim 11, wherein the information regarding each of the channels comprises at least one of a number of adjacent APs using each channel, a signal reception strength of each channel, an amount of interference of each channel, or a load of each channel.

13. The apparatus of claim 11, wherein the controller is configured to:
   with respect to each of the channels, determine at least one adjacent channel which is predicted to be involved in channel bonding according to a channel bonding bandwidth; and
   with respect to each of the channels, determine the respective expected values based on information regarding a corresponding channel and information regarding at least one adjacent channel that is determined for the corresponding channel.

14. The apparatus of claim 13, wherein the controller is configured to:
  determine a weight for each of channel bonding bandwidths; and,
  with respect to each of the channels, determine the respective expected values based on the weight for each of the channel bonding bandwidths, the information regarding the corresponding channel, and the information regarding the at least one adjacent channel that is determined for the corresponding channel.

15. The apparatus of claim 14, wherein the weight for each of the channel bonding bandwidths is determined based on at least one of a throughput and a frequency of channel bonding.

16. The apparatus of claim 15, wherein the controller is configured to:
  set a weight for a narrowest channel bonding bandwidth from among the channel bonding bandwidths to have a greater value than the weights for the other channel bonding bandwidths; and
  set the weights of the other channel bonding bandwidths to have a same value.

17. The apparatus of claim 15, wherein the controller is configured to
  set a weight for a widest channel bonding bandwidth from among the channel bonding bandwidths to have a greater value than the weights of the other channel bonding bandwidths; and
  set the weight for a narrowest channel bonding bandwidth to have a smaller value than the weights for the other channel bonding bandwidths.

18. The apparatus of claim 15, wherein the controller is configured to:
  set a weight for a channel bonding bandwidth having a highest frequency of channel bonding from among the channel bonding bandwidths to have a greater value than the weights for other channel bonding bandwidths; and
  set a weight for a channel bonding bandwidth having a lowest frequency of channel bonding to have a smaller value than the weights for the other channel bonding bandwidths.

19. The apparatus of claim 11, wherein the controller is configured to select a channel which has a lowest expected value as a primary channel that is a criterion for channel bonding.

20. The apparatus of claim 19, wherein the controller is further configured to select at least one secondary channel which is located consecutively after the primary channel, and wherein a number of the selected secondary channels is determined based on a size of a channel bonding bandwidth.

* * * * *